(12) United States Patent
Oshida (10) Patent No.: US 11,377,095 B2
(45) Date of Patent: *Jul. 5, 2022

(54) CONTROLLER AND CONTROL METHOD

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 379 days.

This patent is subject to a terminal disclaimer.

(21) Appl. No.: 16/496,479

(22) PCT Filed: Mar. 6, 2018

(86) PCT No.: PCT/IB2018/051419
§ 371 (c)(1),
(2) Date: Sep. 23, 2019

(87) PCT Pub. No.: WO2018/172870
PCT Pub. Date: Sep. 27, 2018

(65) Prior Publication Data
US 2020/0307553 A1 Oct. 1, 2020

(30) Foreign Application Priority Data

Mar. 21, 2017 (JP) .............................. JP2017-053851

(51) Int. Cl.
| | |
|---|---|
| *B60W 30/045* | (2012.01) |
| *B62J 45/20* | (2020.01) |
| *B62J 45/415* | (2020.01) |
| *B60W 10/06* | (2006.01) |
| *B60W 10/184* | (2012.01) |
| *B62K 11/00* | (2006.01) |

(52) U.S. Cl.
CPC .......... *B60W 30/045* (2013.01); *B60W 10/06* (2013.01); *B60W 10/184* (2013.01);
(Continued)

(58) Field of Classification Search
CPC .... B60T 13/146; B60T 13/662; B60T 13/686; B60T 7/22; B60T 8/00; B60T 8/1706;
(Continued)

(56) References Cited

U.S. PATENT DOCUMENTS

| | | | |
|---|---|---|---|
| 4,989,922 A | 2/1991 | Pickenhahn et al. | |
| 6,708,100 B2 * | 3/2004 | Russell | H01Q 3/40 701/96 |

(Continued)

FOREIGN PATENT DOCUMENTS

| | | |
|---|---|---|
| DE | 102005028995 | 1/2007 |
| DE | 102008021523 | 12/2008 |

(Continued)

OTHER PUBLICATIONS

International Search Report for Application No. PCT/IB2018/051419 dated Jun. 1, 2018 (English Translation, 3 pages).

*Primary Examiner* — Babar Sarwar
(74) *Attorney, Agent, or Firm* — Michael Best & Friedrich LLP (57) ABSTRACT

The invention obtains a controller and a control method capable of appropriately assisting with an operation by a driver while preventing a motorcycle from falling over.
In the controller and the control method according to the invention, in a control mode to make the motorcycle perform an automatic cruise deceleration operation, automatic deceleration that is deceleration of the motorcycle generated by the automatic cruise deceleration operation is controlled in accordance with a lean angle of the motorcycle.

12 Claims, 5 Drawing Sheets

(52) U.S. Cl.
CPC ........... *B62J 45/20* (2020.02); *B62J 45/4151* (2020.02); *B62K 11/00* (2013.01); *B60W 2520/10* (2013.01); *B60W 2520/12* (2013.01); *B60W 2520/18* (2013.01); *B60W 2554/802* (2020.02); *B60W 2710/06* (2013.01); *B60W 2710/18* (2013.01); *B60W 2720/18* (2013.01)

(58) Field of Classification Search
CPC ............. B60T 8/17554; B60T 8/17558; B60T 8/17636; B60T 8/261; B60T 8/3225; B60W 10/06; B60W 10/184; B60W 2030/043; B60W 2300/36; B60W 2520/10; B60W 2520/12; B60W 2520/18; B60W 2554/802; B60W 2710/06; B60W 2710/18; B60W 2720/18; B60W 30/045; B60W 30/16; B60Y 2200/12; B62J 27/00; B62J 45/20; B62J 45/4151; B62K 11/00; B62K 11/04; G08G 1/166
See application file for complete search history.

(56) References Cited

U.S. PATENT DOCUMENTS

| | | | |
|---|---|---|---|
| 9,580,009 B1* | 2/2017 | Lenker | B62J 45/4152 |
| 10,029,683 B1* | 7/2018 | Ginther | B60W 50/14 |
| 10,053,088 B1* | 8/2018 | Askeland | B60W 30/18 |
| 2008/0046159 A1* | 2/2008 | Baijens | B60K 31/0008 701/93 |
| 2013/0238206 A1* | 9/2013 | Lemejda | B60T 8/1766 701/70 |
| 2014/0358369 A1* | 12/2014 | Anderfaas | B60W 30/045 701/37 |
| 2015/0274019 A1* | 10/2015 | Matsuda | B60T 8/246 701/22 |
| 2015/0364061 A1* | 12/2015 | Kurosawa | G09B 9/058 434/61 |
| 2017/0158118 A1* | 6/2017 | Lenker | B60Q 1/2603 |
| 2017/0327109 A1* | 11/2017 | Watanabe | B60T 8/1755 |
| 2017/0349185 A1* | 12/2017 | McNew | B60W 30/16 |
| 2018/0126994 A1* | 5/2018 | Chang | G01S 13/931 |
| 2019/0023264 A1* | 1/2019 | Mizutani | B60T 8/1706 |
| 2019/0271543 A1* | 9/2019 | Serita | B62J 45/4151 |

FOREIGN PATENT DOCUMENTS

| | | |
|---|---|---|
| DE | 102013200044 | 7/2014 |
| EP | 2657094 | 10/2013 |
| EP | 2738075 | 6/2014 |
| EP | 2810836 | 12/2014 |
| JP | 2009116882 | 5/2009 |
| JP | 2013244876 A | 12/2013 |
| JP | 2015040020 A | 3/2015 |
| WO | 2012163567 | 12/2012 |
| WO | 2013146907 | 10/2013 |

* cited by examiner

CONTROLLER AND CONTROL METHOD

BACKGROUND OF THE INVENTION

The present disclosure relates to a controller and a control method capable of appropriately assisting with an operation by a driver while preventing a motorcycle from falling over.

As a conventional technique related to a motorcycle, a technique of assisting with an operation by a driver has been available.

For example, a driver assistance system is disclosed in JP-A-2009-116882. Based on information detected by a sensor that detects presence of an obstacle in a travel direction or substantially in the travel direction, the driver assistance system warns a driver of the motorcycle that the motorcycle inappropriately approaches the obstacle.

SUMMARY OF THE INVENTION

In order to assist with the operation by the driver, use of an automatic cruise travel mode is considered. The automatic cruise travel mode is a travel mode in which the motorcycle continues traveling with behavior thereof being at least partially controlled automatically. In the automatic cruise travel mode, for example, the motorcycle is controlled that a distance therefrom to a preceding vehicle approximates a distance reference value. For this reason, the motorcycle is possibly controlled to perform an automatic cruise deceleration operation in which the motorcycle decelerates regardless of presence or absence of the operation by the driver in the automatic cruise travel mode. Here, the motorcycle tends to have unstable posture when compared to a four-wheeled vehicle, for example. This leads to such a problem that the motorcycle possibly falls over due to deceleration by the automatic cruise deceleration operation.

The invention has been made with the above-described problem as the background and therefore obtains a controller and a control method capable of appropriately assisting with an operation by a driver while preventing a motorcycle from falling over.

A controller according to an aspect of the invention controls behavior of a motorcycle and includes: an acquisition section that acquires a lean angle of the motorcycle; and an execution section that initiates a control mode to make the motorcycle perform an automatic cruise deceleration operation. In the control mode, automatic deceleration that is deceleration of the motorcycle generated by the automatic cruise deceleration operation is controlled in accordance with the lean angle.

A control method according to another aspect of the invention controls behavior of a motorcycle and includes: an execution step of initiating a control mode to make the motorcycle perform an automatic cruise deceleration operation; and an acquisition step of acquiring a lean angle of the motorcycle. In the control mode, automatic deceleration that is deceleration of the motorcycle generated by the automatic cruise deceleration operation is controlled in accordance with the lean angle.

In the controller and the control method according to the invention, in the control mode to make the motorcycle perform the automatic cruise deceleration operation, the automatic deceleration that is the deceleration of the motorcycle generated by the automatic cruise deceleration operation is controlled in accordance with the lean angle of the motorcycle. In this way, the automatic deceleration can appropriately be controlled in accordance with posture of the motorcycle. Therefore, an operation by a driver can appropriately be assisted while falling of the motorcycle is prevented.

DETAILED DESCRIPTION

A description will hereinafter be made on a controller and a control method according to the invention by using the drawings. Note that a description will hereinafter be made on a case where a motorcycle is a two-wheeled motor vehicle; however, the motorcycle may be another motorcycle such as a three-wheeled motor vehicle. In addition, a description will be made on a case where each of a front-wheel brake mechanism and a rear-wheel brake mechanism is provided in one unit; however, at least one of the front-wheel brake mechanism and the rear-wheel brake mechanism may be provided in multiple units.

A configuration, an operation, and the like, which will be described below, constitute merely one example, and the controller and the control method according to the invention are not limited to a case with such a configuration, such an operation, and the like.

The same or similar description will appropriately be simplified or will not be made below. In the drawings, the same or similar members or portions will not be denoted by a reference sign or will be denoted by the same reference sign. In addition, a detailed structure will appropriately be depicted in a simplified manner or will not be depicted.

<Configuration of Brake System>

Figure 1:
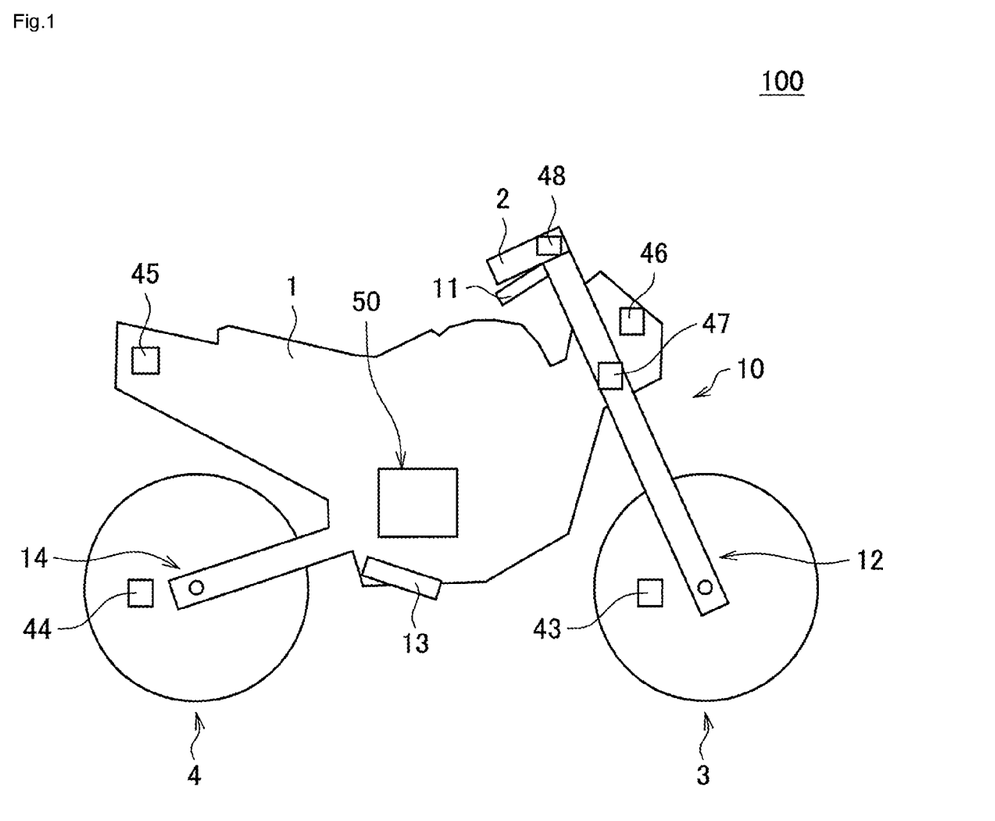
FIG. 1 is a schematic view of an exemplary configuration of a motorcycle on which a brake system according to an embodiment of the invention is mounted.
Figure 2:
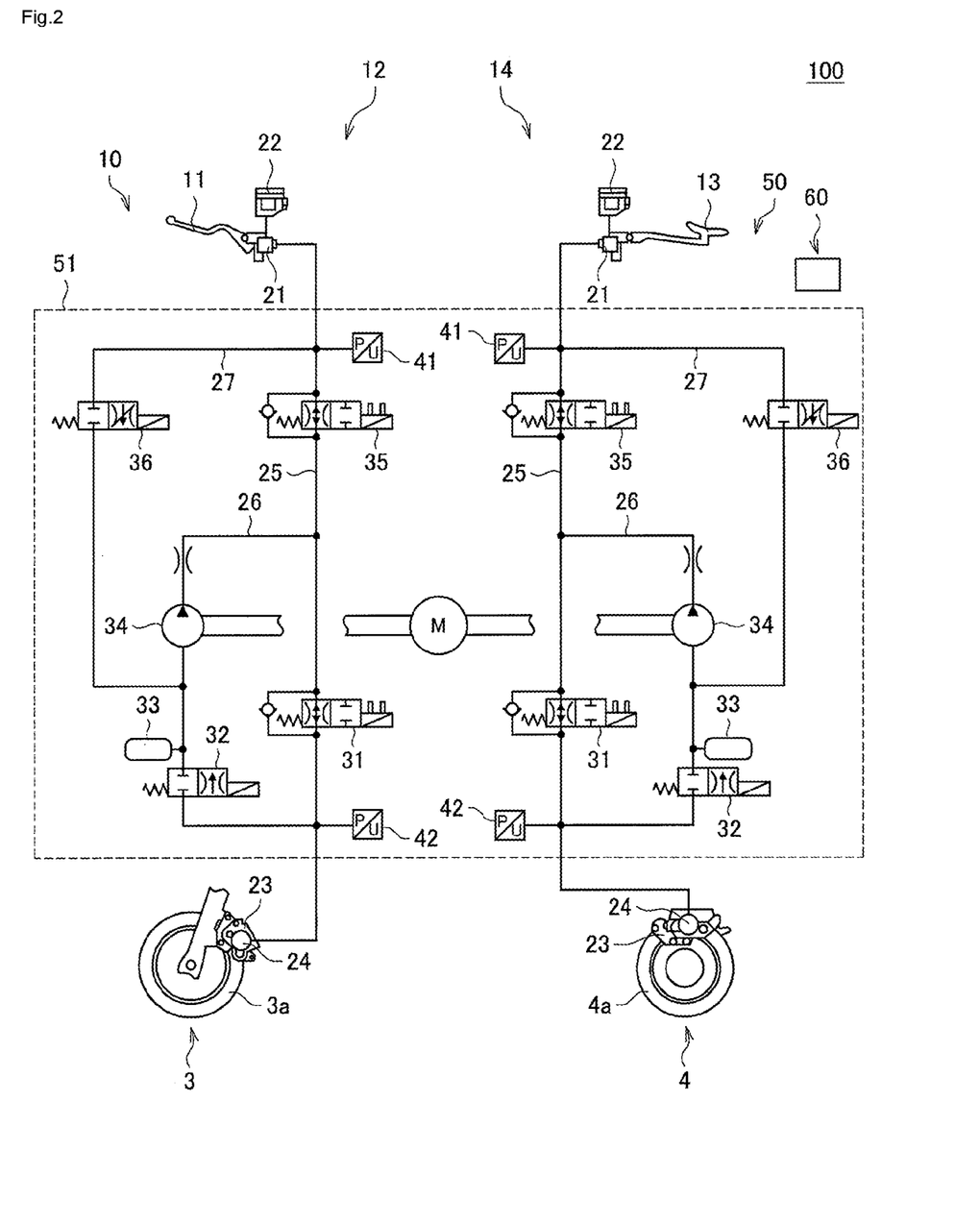
FIG. 2 is a schematic view of an exemplary configuration of the brake system according to the embodiment of the invention.
Figure 3:
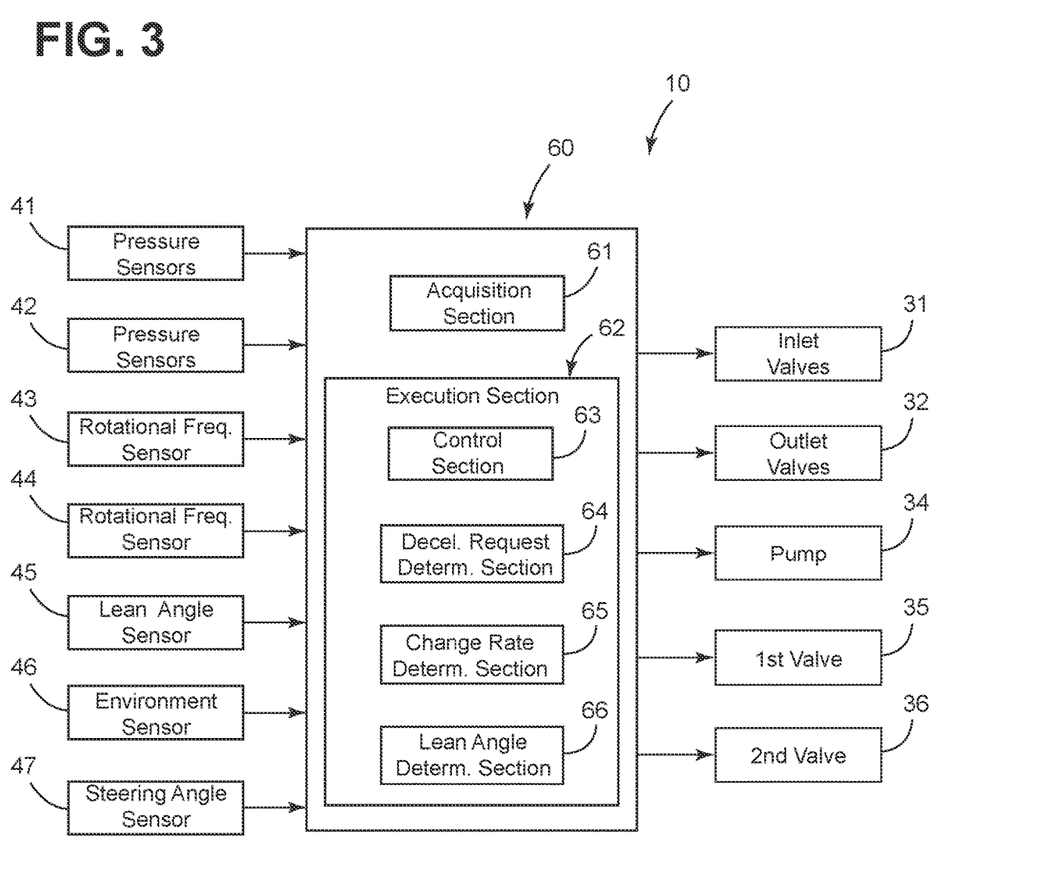
FIG. 3 is a block diagram of an exemplary functional configuration of a controller according to the embodiment of the invention.
Figure 4:
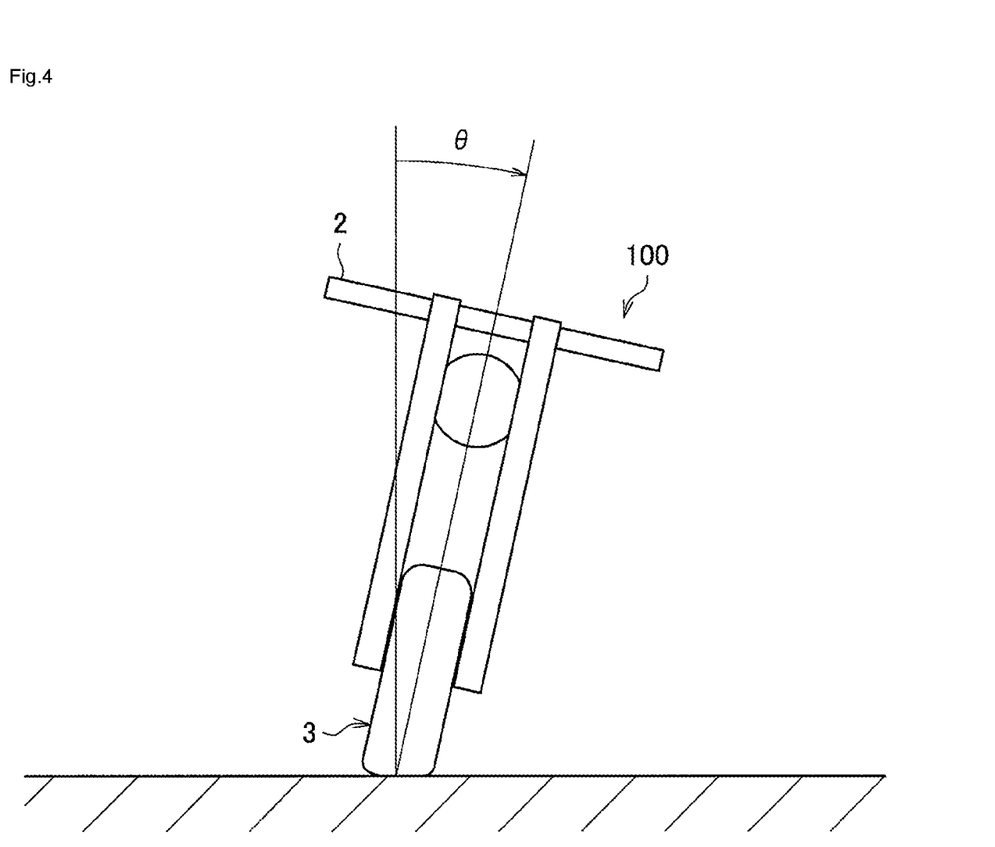
FIG. 4 is a view illustrating a lean angle.

A description will be made on a configuration of a brake system 10 according to an embodiment of the invention. FIG. 1 is a schematic view of an exemplary configuration of a motorcycle 100 on which a brake system 10 according to the embodiment of the invention is mounted. FIG. 2 is a schematic view of an exemplary configuration of the brake system 10 according to the embodiment of the invention. FIG. 3 is a block diagram of an exemplary functional configuration of a controller 60 according to the embodiment of the invention. FIG. 4 is a view illustrating a lean angle.

As depicted in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and is operated by a driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. A first valve (USV) 35 is provided in a portion of the primary channel 25 that is between an end of the primary channel 25 on the master cylinder 21 side and a portion of the primary channel 25 to which a downstream end of the secondary channel 26 is connected. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in the unenergized state and opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and the controller (ECU) 60. In the brake system 10, the hydraulic pressure control unit 50 is a unit that has a function of controlling a hydraulic pressure of the brake fluid in each of the wheel cylinders 24, that is, a braking force to be applied to the front wheel 3 by the front-wheel brake mechanism 12 and a braking force to be applied to the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, that is, in a state where an automatic cruise deceleration operation, which will be described below, is not performed, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) in the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not depicted) in the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby applied to the rear wheel 4.

As depicted in FIG. 2 and FIG. 3, the brake system 10 includes master-cylinder pressure sensors 41, wheel-cylinder pressure sensors 42, a front-wheel rotational frequency sensor 43, a rear-wheel rotational frequency sensor 44, a lean angle sensor 45, a peripheral environment sensor 46, a steering angle sensor 47, and an input device 48, for example. Each of the sensors and the input device 48 is communicable with the controller 60.

Each of the master-cylinder pressure sensors 41 detects a hydraulic pressure of the brake fluid in the master cylinder 21 and outputs a detection result. Each of the master-cylinder pressure sensors 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

Each of the wheel-cylinder pressure sensors 42 detects the hydraulic pressure of the brake fluid in the wheel cylinder 24 and outputs a detection result. Each of the wheel-cylinder pressure sensors 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The front-wheel rotational frequency sensor 43 and the rear-wheel rotational frequency sensor 44 are respectively provided on the front wheel 3 and the rear wheel 4.

The lean angle sensor 45 detects a lean angle of the motorcycle 100 and an angular velocity of the lean angle thereof, and outputs a detection result. For example, the lean angle corresponds to a tilt angle θ of the motorcycle 100 in a rolling direction with respect to an upper vertical direction depicted in FIG. 4. Note that the motorcycle 100 is tilted in the rolling direction with respect to the upper vertical direction during turning travel. More specifically, an inertial measurement unit (IMU) that includes a three-axis gyroscope sensor and a three-directional acceleration sensor is used as the lean angle sensor 45. The lean angle sensor 45 may detect another physical quantity that can substantially be converted to the lean angle of the motorcycle 100 and the angular velocity of the lean angle thereof. The lean angle sensor 45 is provided in the trunk 1.

The peripheral environment sensor 46 detects peripheral environment of the motorcycle 100 and outputs a detection result. For example, as the peripheral environment, the peripheral environment sensor 46 detects a distance from the motorcycle 100 to a preceding vehicle that travels ahead of the motorcycle 100. The peripheral environment sensor 46 may detect another physical quantity that can substantially be converted to the distance from the motorcycle 100 to the preceding vehicle. More specifically, a camera that captures an image in front of the motorcycle 100 or a distance measurement sensor that can detect the distance from the motorcycle 100 to the preceding vehicle is used as the peripheral environment sensor 46. The peripheral environment sensor 46 is provided in a front portion of the trunk 1.

The steering angle sensor 47 detects a steering angle of the motorcycle 100 and an angular velocity of the steering angle thereof, and outputs a detection result. The steering angle sensor 47 may detect another physical quantity that can substantially be converted to the steering angle of the motorcycle 100 and the angular velocity of the steering angle thereof. The steering angle sensor 47 is provided on the handlebar 2.

The input device 48 receives a travel mode selection operation by the driver and outputs information indicative of the received operation. As the travel mode, the input device 48 at least receives the selection operation in which an automatic cruise travel mode is selected. The automatic cruise travel mode is a travel mode in which the motorcycle 100 continues traveling with behavior thereof being at least partially controlled automatically. In the automatic cruise travel mode, for example, the motorcycle 100 is controlled that the distance therefrom to the preceding vehicle approximates a distance reference value. As the distance from the motorcycle 100 to the preceding vehicle, the distance reference value is set to such a value that the driver's safety can be secured. In the automatic cruise travel mode, the motorcycle 100 may be controlled that a body speed thereof approximates a speed reference value. For example, the speed reference value may appropriately be set by the driver. The body speed of the motorcycle 100 may be computed on the basis of the rotational frequencies of the front wheel 3 and the rear wheel 4. For example, a lever, a button, or a touch panel may be used as the input device 48. The input device 48 is provided on the handlebar 2, for example.

The controller 60 controls the behavior of the motorcycle 100. The controller 60 includes an acquisition section 61 and an execution section 62, for example. The acquisition section 61 acquires the information that is output from each of the sensors and the input device 48, and outputs the acquired information to the execution section 62. The execution section 62 includes a control section 63, a deceleration request determination section 64, a change rate determination section 65, and a lean angle determination section 66, for example. Each of the determination sections executes determination processing by using the information that is output from each of the sensors. When the driver selects the automatic cruise travel mode, the execution section 62 initiates a control mode to make the motorcycle 100 perform the automatic cruise deceleration operation in accordance with a determination result by the deceleration request determination section 64. In the control mode, the control section 63 outputs a command that governs the operations of the inlet valves 31, the outlet valves 32, the pumps 34, the first valves 35, the second valves 36, and the like in accordance with the determination result by each of the determination sections, so as to control automatic deceleration that is deceleration of the motorcycle 100 generated by the automatic cruise deceleration operation.

More specifically, in the control mode, the control section 63 controls the automatic deceleration in accordance with the lean angle of the motorcycle 100. Alternatively, in the control mode, the control section 63 may control the automatic deceleration in accordance with a change rate of a state amount that is related to posture of the motorcycle 100 during the turning travel. Note that the control of the automatic deceleration includes control to permit or prohibit the automatic cruise deceleration operation in addition to the control of the automatic deceleration of the motorcycle 100 that is generated during the automatic cruise deceleration operation.

The controller 60 includes a storage element, and the information such as the reference values used in the processing executed by the controller 60 may be stored in the storage element in advance.

The automatic cruise travel mode includes an automatic cruise acceleration operation in which the motorcycle 100 is accelerated regardless of presence or absence of the operation by the driver. The automatic cruise acceleration operation is controlled by another controller that is a separate component from the controller 60 or is integrated with the controller 60, for example. Automatic acceleration as acceleration of the motorcycle 100 that is generated during the automatic cruise acceleration operation may be controlled when the other controller controls engine output of the motorcycle 100.

<Operation of Brake System>

Figure 5:
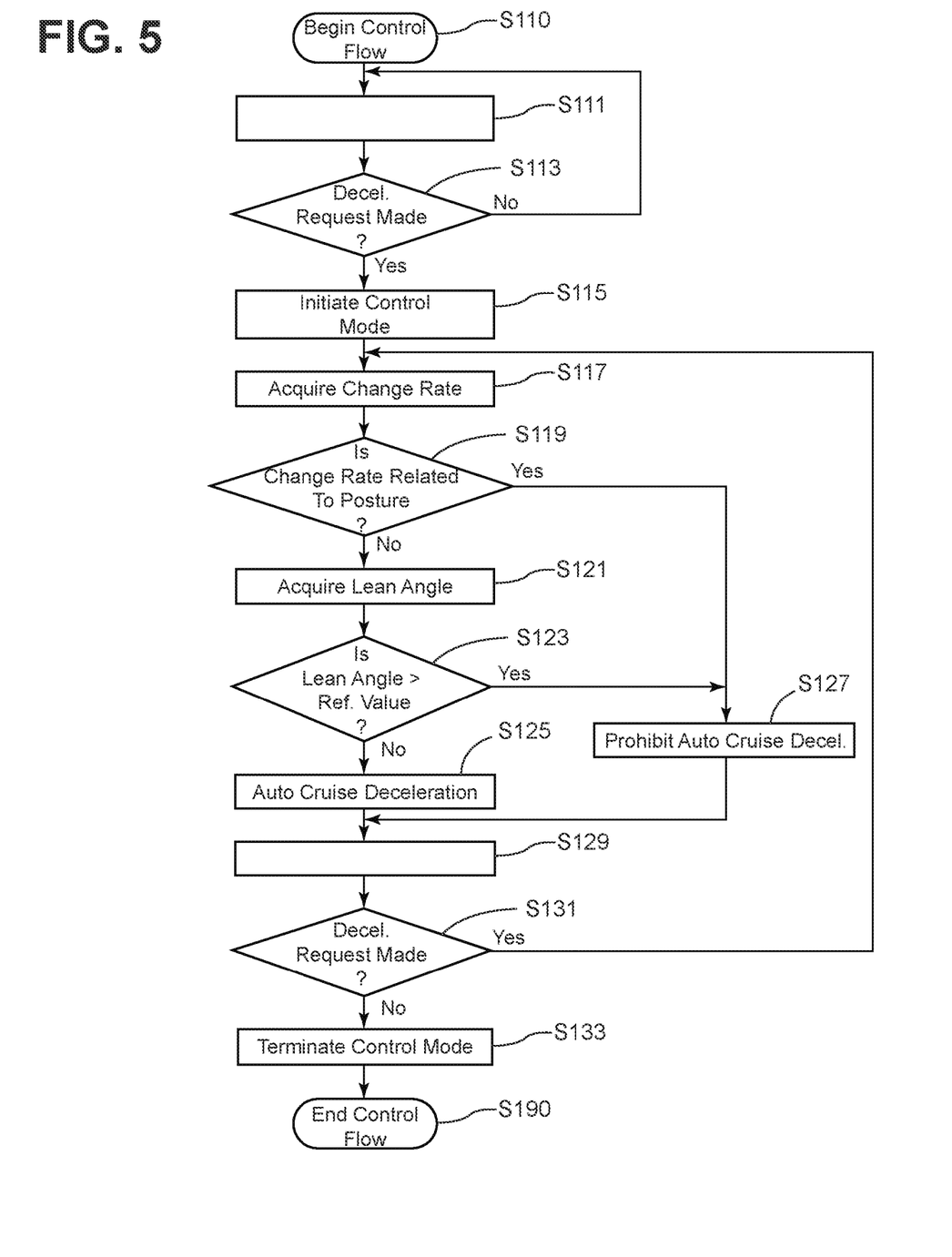
FIG. 5 is a flowchart of an example of a processing procedure that is executed by the controller according to the embodiment of the invention.

A description will be made on an operation of the brake system 10 according to the embodiment of the invention. FIG. 5 is a flowchart of an example of a processing procedure that is executed by the controller 60 according to the embodiment of the invention. A control flow depicted in FIG. 5 is repeated while the automatic cruise travel mode is selected. Step S110 and step S190 in FIG. 5 respectively correspond to initiation and termination of the control flow. In step S110, the control flow is initiated in a state where the control mode is not initiated.

In step S113, the deceleration request determination section 64 determines whether a deceleration request has been made. If it is determined that the deceleration request has been made (step S113/Yes), the processing proceeds to step S115. On the other hand, if it is determined that the deceleration request has not been made (step S113/No), step S113 is repeated. For example, in the case where the distance from the motorcycle 100 to the preceding vehicle falls below the distance reference value, the deceleration request determination section 64 determines that the deceleration request has been made. Note that, in the case where the motorcycle 100 is controlled in the automatic cruise travel mode such that the body speed thereof approximates the speed reference value, the deceleration request determination section 64 may determine that the deceleration request has been made when the body speed of the motorcycle 100 exceeds the speed reference value.

The above description has been made on the case where the deceleration request determination section 64 compares the distance from the motorcycle 100 to the preceding vehicle with the distance reference value or compares the body speed of the motorcycle 100 with the speed reference value. However, these comparisons may be made by the other controller that differs from the controller 60. In such a case, the other controller outputs information indicative of results of these comparisons or information that directly indicates whether the deceleration request has been made to the controller 60. In this way, the deceleration request determination section 64 can make the determination.

In step S115, the execution section 62 initiates the control mode to make the motorcycle 100 perform the automatic cruise deceleration operation.

Next, in step S117, the acquisition section 61 acquires the change rate of the state amount that is related to the posture of the motorcycle 100 during the turning travel. The state amount that is related to the posture of the motorcycle 100 during the turning travel includes the lean angle, the angular velocity of the lean angle, the steering angle, or the angular velocity of the steering angle, for example.

Next, in step S119, the change rate determination section 65 determines whether the change rate of the state amount that is related to the posture of the motorcycle 100 during the turning travel exceeds a change rate reference value. If it is determined that the change rate exceeds the change rate reference value (step S119/Yes), the processing proceeds to step S127. On the other hand, if it is determined that the change rate does not exceed the change rate reference value (step S119/No), the processing proceeds to step S121. The change rate reference value is set to such a value that a determination on whether the driver has his/her intention to avoid the preceding vehicle can be made.

In step S121, the acquisition section 61 acquires the lean angle of the motorcycle 100.

Next, in step S123, the lean angle determination section 66 determines whether the lean angle of the motorcycle 100 exceeds a lean angle reference value. If it is determined that the lean angle exceeds the lean angle reference value (step S123/Yes), the processing proceeds to step S127. On the other hand, if it is determined that the lean angle does not exceed the lean angle reference value (step S123/No), the processing proceeds to step S125. The lean angle reference value is such a value that a determination on whether a possibility of falling of the motorcycle 100, which is resulted from generation of the deceleration of the motorcycle 100, is excessively high can be made, and is set in accordance with a friction coefficient of a travel road surface, a design specification of the motorcycle 100, or the like, for example.

In step S125, the control section 63 permits the automatic cruise deceleration operation. Once permitting the automatic cruise deceleration operation, the control section 63 causes the generation of the automatic deceleration that is the deceleration irrespective of the driver's operation, and makes the motorcycle 100 perform the automatic cruise deceleration operation. For example, the control section 63 causes the generation of the automatic deceleration through generation of the braking force that is applied to the wheel by at least one of the front-wheel brake mechanism 12 and the rear-wheel brake mechanism 14. More specifically, the control section 63 drives the pump 34 in a state where the inlet valve 31 is opened, the outlet valve 32 is closed, the first valve 35 is closed, and the second valve 36 is opened, so as to cause the generation of the braking force that is applied to the wheel.

The control section 63 controls a rotational frequency of the pump 34 and thereby controls the braking force that is applied to the wheel. More specifically, the control section 63 computes reference target deceleration that is a reference value of a target value of the automatic deceleration. For example, as a difference between the distance from the motorcycle 100 to the preceding vehicle and the distance reference value is increased (in other words, as the motorcycle 100 comes closer to the preceding vehicle), the control section 63 computes a high value as the reference target deceleration. Here, the control section 63 may compute a constant value as the reference target deceleration irrespective of a magnitude of the difference between the distance from the motorcycle 100 to the preceding vehicle and the distance reference value. Then, the control section 63 decides target deceleration on the basis of the computed reference target deceleration. For example, the control section 63 decides a value that is acquired by multiplying the reference target deceleration by a coefficient as the target deceleration. Next, based on the target deceleration, the control section 63 decides a target hydraulic pressure that is a target value of the hydraulic pressure of the brake fluid in the wheel cylinder 24. Then, the control section 63 controls the rotational frequency of the pump 34 such that the hydraulic pressure of the brake fluid in the wheel cylinder 24 matches the target hydraulic pressure. In this way, the automatic deceleration is controlled to match the target deceleration.

In the case where the motorcycle 100 is controlled in the automatic cruise travel mode such that the body speed thereof approximates the speed reference value, the control section 63 computes the higher value as the reference target deceleration as a difference between the body speed of the motorcycle 100 and the speed reference value is increased, for example. Here, the control section 63 may compute a constant value as the reference target deceleration irrespective of a magnitude of the difference between the body speed of the motorcycle 100 and the speed reference value.

The above description has been made on the case where the control section 63 computes the reference target deceleration. However, the other controller that differs from the controller 60 may compute the reference target deceleration. In such a case, the other controller outputs information indicative of the reference target deceleration to the controller 60. In this way, the control of the automatic deceleration by the control section 63 can be realized.

For example, in the case where the lean angle is large, the control section 63 makes the motorcycle 100 perform the automatic cruise deceleration operation in which the automatic deceleration is lower than the automatic deceleration in the automatic cruise deceleration operation that is performed when the lean angle is small. More specifically, the control section 63 decides the value that is acquired by multiplying the reference target deceleration by the coefficient as the target deceleration, and the coefficient becomes smaller as the lean angle is increased. In this way, the control section 63 controls the automatic deceleration.

Alternatively, for example, in the case where the change rate of the state amount that is related to the posture of the motorcycle 100 during the turning travel is high, the control section 63 makes the motorcycle 100 perform the automatic cruise deceleration operation, and the automatic deceleration therein is lower than the automatic deceleration in the automatic cruise deceleration operation that is performed when the change rate is low. More specifically, the control section 63 decides the value that is acquired by multiplying the reference target deceleration by the coefficient as the target deceleration, and the coefficient becomes smaller as the change rate of the state amount that is related to the posture of the motorcycle 100 during the turning travel is increased. In this way, the control section 63 controls the automatic deceleration.

The control section 63 may decide the target deceleration in accordance with both of the lean angle and the change rate of the state amount that is related to the posture of the motorcycle 100 during the turning travel. In such a case, the control section 63 multiplies the reference target deceleration by both of the coefficient corresponding to the lean angle and the coefficient corresponding to the change rate of the state amount, and decides the acquired value as the target deceleration, for example.

Note that the above description has been made on the case where the control section 63 controls the automatic deceleration by controlling the braking force that is applied to the wheel. However, the control section 63 may control the automatic deceleration by controlling the engine output of the motorcycle 100. More specifically, the control section 63 may control the automatic deceleration by using an operational effect of engine brake that is exerted when the engine output is lowered. Alternatively, the control section 63 may control the automatic deceleration by controlling both of the braking force that is applied to the wheel and the engine output.

In step S127, the control section 63 prohibits the automatic cruise deceleration operation. When prohibiting the automatic cruise deceleration operation, the control section 63 brings the motorcycle 100 into the normal state where the deceleration is generated in accordance with the driver's operation. More specifically, the control section 63 brings the motorcycle 100 into a state where the inlet valves 31 are opened, the outlet valves 32 are closed, the first valves 35 are opened, and the second valves 36 are closed, so as to prohibit driving of the pumps 34.

Following step S125 or step S127, in step S131, the deceleration request determination section 64 determines whether the deceleration request has been made. If it is determined that the deceleration request has been made (step S131/Yes), the processing returns to step S117. On the other hand, if it is determined that the deceleration request has not been made (step S131/No), the processing proceeds to step S133.

As described above, if it is determined in step S131 that the deceleration request has been made (step S131/Yes), the control mode continues, and the processing from step S117 to step S131 is repeated. In the case where the control mode continues, the control section 63 appropriately switches between a state where the automatic cruise deceleration operation is permitted and a state where the automatic cruise deceleration operation is prohibited in accordance with determination results of the determination processing by the change rate determination section 65 and the lean angle determination section 66 (step S119 and step S123).

In the case where the determination results in step S119 and step S123 are No in the state where the automatic cruise deceleration operation is permitted, the control section 63 continues the state where the automatic cruise deceleration operation is permitted. In this case, for example, the control section 63 controls the automatic deceleration of the motorcycle 100, which is generated during the automatic cruise deceleration operation, in accordance with the lean angle that is acquired during the automatic cruise deceleration operation. In addition, for example, the control section 63 controls the automatic deceleration of the motorcycle 100, which is generated during the automatic cruise deceleration operation, in accordance with the change rate of the state amount that is related to the posture of the motorcycle 100 during the turning travel and that is acquired during the automatic cruise deceleration operation.

In the case where at least one of the determination results in step S119 and step S123 is Yes in the state where the automatic cruise deceleration operation is permitted, the control section 63 cancels the state where the automatic cruise deceleration operation is permitted, and prohibits the automatic cruise deceleration operation. For example, in the case where the change rate of the state amount that is related to the posture of the motorcycle 100 during the turning travel and that is acquired during the automatic cruise deceleration operation exceeds the change rate reference value, the control section 63 cancels the state where the automatic cruise deceleration operation is permitted, and prohibits the automatic cruise deceleration operation. In addition, for example, in the case where the lean angle that is acquired during the automatic cruise deceleration operation exceeds the lean angle reference value, the control section 63 cancels the state where the automatic cruise deceleration operation is permitted, and prohibits the automatic cruise deceleration operation.

In the case where at least one of the determination results in step S119 and step S123 is Yes in the state where the automatic cruise deceleration operation is prohibited, the control section 63 continues the state where the automatic cruise deceleration operation is prohibited.

In the case where the determination results in step S119 and step S123 are No in the state where the automatic cruise deceleration operation is prohibited, the control section 63 cancels the state where the automatic cruise deceleration operation is prohibited, and permits the automatic cruise deceleration operation. For example, in the cases where the determination result in step S119 is No and the lean angle that is acquired during prohibition of the automatic cruise deceleration operation falls below the lean angle reference value, the control section 63 cancels the state where the automatic cruise deceleration operation is prohibited, and permits the automatic cruise deceleration operation. Note that the determination processing in step S119 may be eliminated from the control flow depicted in FIG. 5. In such a case, in the case where the lean angle that is acquired during the prohibition of the automatic cruise deceleration operation falls below the lean angle reference value, the control section 63 cancels the state where the automatic cruise deceleration operation is prohibited, and permits the automatic cruise deceleration operation.

In step S133, the execution section 62 terminates the control mode.

<Effects of Brake System>

A description will be made on effects of the brake system 10 according to the embodiment of the invention.

In the brake system 10, the automatic deceleration is controlled in accordance with the lean angle of the motorcycle 100 in the control mode in which the motorcycle 100 performs the automatic cruise deceleration operation. In this way, the automatic deceleration can appropriately be controlled in accordance with the posture of the motorcycle 100. Therefore, the operation by the driver can appropriately be assisted while falling of the motorcycle 100 is prevented.

Preferably, in the control mode, in the case where the lean angle is large, the brake system 10 performs the automatic cruise deceleration operation, and the automatic deceleration therein is lower than the automatic deceleration in the automatic cruise deceleration operation that is performed when the lean angle is small. Here, grounding areas of tires of the motorcycle 100 are reduced as the lean angle is increased. In addition, a friction characteristic in a grounding portion of each of the tires of the motorcycle 100 possibly has such a characteristic that a friction force is less likely to be generated in an advancing direction as the lean angle is increased. Accordingly, the possibility of falling of the motorcycle 100, which is resulted from the generation of the deceleration of the motorcycle 100, tends to be increased as the lean angle is increased. Thus, in the case where the lean angle is large, the automatic cruise deceleration operation is performed, and the automatic deceleration therein is lower than the automatic deceleration in the automatic cruise deceleration operation that is performed when the lean angle is small. In this way, falling of the motorcycle 100 can effectively be prevented.

Preferably, in the control mode, the brake system 10 controls the automatic deceleration of the motorcycle 100, which is generated during the automatic cruise deceleration operation, in accordance with the lean angle that is acquired during the automatic cruise deceleration operation. In this way, the automatic deceleration of the motorcycle 100, which is generated during the automatic cruise deceleration operation, can appropriately be controlled in accordance with a change in the lean angle over time during the automatic cruise deceleration operation. For example, the automatic deceleration can be increased along with a decrease in the lean angle that is resulted from the automatic cruise deceleration operation. Therefore, an effect of appropriately assisting with the operation by the driver can be enhanced while falling of the motorcycle 100 is prevented.

Preferably, in the control mode, the brake system 10 prohibits the automatic cruise deceleration operation in the case where the lean angle exceeds the lean angle reference value. In this way, in the case where the possibility of falling of the motorcycle 100, which is resulted from the generation of the deceleration of the motorcycle 100, is excessively high, the automatic cruise deceleration operation can be prohibited. Therefore, falling of the motorcycle 100 can effectively be prevented.

Preferably, in the control mode, the brake system 10 permits the automatic cruise deceleration operation in the case where the lean angle that is acquired during the prohibition of the automatic cruise deceleration operation falls below the lean angle reference value. In this way, in the case where the possibility of falling of the motorcycle 100, which is resulted from the generation of the deceleration of the motorcycle 100, becomes relatively low even during the prohibition of the automatic cruise deceleration operation, the automatic cruise deceleration operation can appropriately be performed. Therefore, the effect of appropriately assisting with the operation by the driver can be enhanced.

Preferably, in the control mode, the brake system 10 controls the automatic deceleration in accordance with the change rate of the state amount that is related to the posture of the motorcycle 100 during the turning travel. In this way, the automatic deceleration can further appropriately be controlled in accordance with the posture of the motorcycle 100. Therefore, the effect of appropriately assisting with the operation by the driver can further be enhanced while falling of the motorcycle 100 is prevented.

Preferably, in the control mode, the brake system 10 prohibits the automatic cruise deceleration operation in the case where the change rate of the state amount that is related to the posture of the motorcycle 100 during the turning travel exceeds the change rate reference value. In this way, in the case where it is assumed that the driver has his/her intention to avoid the preceding vehicle, the automatic cruise deceleration operation can be prohibited. Thus, the generation of the automatic deceleration against the driver's intention can be prevented. Therefore, falling of the motorcycle 100 can effectively be prevented.

Note that, in the control mode, the control section 63 may prohibit the automatic cruise deceleration operation in the case where an operation amount of the motorcycle 100 by the driver exceeds an operation amount reference value. The operation of the motorcycle 100 by the driver includes an accelerator pedal operation, a brake operation, and a clutch operation, for example. The operation amount reference value is set to such a value that a determination on whether the driver has operated the motorcycle 100 can be made. Accordingly, in the case where the operation amount exceeds the operation amount reference value, the automatic cruise deceleration operation is prohibited. In this way, the generation of the automatic deceleration against the operation of the motorcycle 100 by the driver can be prevented. Therefore, falling of the motorcycle 100 can effectively be prevented.

In addition, in the control mode, in the case where the change rate of the state amount that is related to the posture of the motorcycle 100 during the turning travel exceeds the change rate reference value, the control section 63 may reduce the operation amount reference value in comparison with the case where the change rate does not exceed the change rate reference value. In this way, in the case where it is assumed that the driver has his/her intention to avoid the preceding vehicle, sensitivity to detection of the operation of the motorcycle 100 by the driver can be improved. Therefore, the automatic cruise deceleration operation can further reliably be prohibited.

Preferably, in the control mode, in the case where the change rate of the state amount that is related to the posture of the motorcycle 100 during the turning travel is high, the brake system 10 performs the automatic cruise deceleration operation, and the automatic deceleration therein is lower than the automatic deceleration in the automatic cruise deceleration operation that is performed when the change rate is low. Here, it is assumed that the possibility of the driver having his/her intention to avoid the preceding vehicle is higher as the change rate of the state amount is increased. Accordingly, in the case where the change rate of the state amount is high, the automatic cruise deceleration operation is performed, and the automatic deceleration therein is lower than the automatic deceleration in the automatic cruise deceleration operation that is performed when the change rate is low. In this way, the automatic deceleration can appropriately be controlled in accordance with the possibility of driver having his/her intention to avoid the preceding vehicle. Therefore, falling of the motorcycle 100, which is resulted from the generation of the automatic deceleration against the driver's intention, can be prevented.

Preferably, in the control mode, the automatic deceleration of the motorcycle 100, which is generated during the automatic cruise deceleration operation, is controlled in the brake system 10 in accordance with the change rate of the state amount that is related to the posture of the motorcycle 100 during the turning travel and that is acquired during the automatic cruise deceleration operation. In this way, the automatic deceleration of the motorcycle 100, which is generated during the automatic cruise deceleration operation, can appropriately be controlled in accordance with a change in the change rate of the state amount over time during the automatic cruise deceleration operation. Therefore, falling of the motorcycle 100, which is resulted from the generation of the automatic deceleration against the driver's intention, can effectively be prevented.

Preferably, the state amount that is related to the posture of the motorcycle 100 during the turning travel and that is used for the control of the automatic deceleration includes the lean angle of the motorcycle 100 or the angular velocity of the lean angle thereof. In this way, the automatic deceleration can be controlled by using the detection result that is output from the lean angle sensor 45. Thus, another sensor (for example, the steering angle sensor 47) can be eliminated from the configuration of the brake system 10. Therefore, the brake system 10 can be simplified.

The invention is not limited to each of the embodiments. For example, all or parts of the embodiments may be combined, or only a part of each of the embodiments may be implemented. In addition, an order of the steps may be switched, for example.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational frequency sensor
44: Rear-wheel rotational frequency sensor
45: Lean angle sensor
46: Peripheral environment sensor
47: Steering angle sensor
48: Input device
50: Hydraulic pressure control unit
51: Base body
60: Controller
61: Acquisition section
62: Execution section
63: Control section
64: Deceleration request determination section
65: Change rate determination section
66: Lean angle determination section
100: Motorcycle

What is claimed is:
1. A controller (60) controlling behavior of a motorcycle (100), the controller comprising:
an acquisition section (61) that acquires a lean angle of the motorcycle (100); and
an execution section (62) that initiates a control mode to make the motorcycle (100) perform an automatic cruise deceleration operation when a distance from the motorcycle to a preceding vehicle falls below a distance reference value or when a body speed of the motorcycle exceeds a speed reference value, wherein
in the control mode, automatic deceleration that is deceleration of the motorcycle (100) generated by the automatic cruise deceleration operation is controlled in accordance with the lean angle.
2. The controller according to claim 1, wherein
in the control mode, in the case where the lean angle is large without exceeding the lean angle reference value, the automatic cruise deceleration operation is performed, and the automatic deceleration therein is lower than the automatic deceleration in the automatic cruise deceleration operation that is performed when the lean angle is small.
3. The controller according to claim 2, wherein
in the control mode, the automatic deceleration of the motorcycle (100), which is generated during the automatic cruise deceleration operation, is controlled in accordance with the lean angle that is acquired during the automatic cruise deceleration operation.
4. The controller according to claim 2, wherein
the acquisition section (61) acquires a change rate of a state amount that is related to posture of the motorcycle (100) during turning travel, and
in the control mode, in the case where the change rate is high, the automatic cruise deceleration operation is performed, and the automatic deceleration therein is lower than the automatic deceleration in the automatic cruise deceleration operation that is performed when the change rate is low.
5. The controller according to claim 1, wherein
in the control mode, in the case where the lean angle exceeds a lean angle reference value, the automatic cruise deceleration operation is prohibited.
6. The controller according to claim 5, wherein
in the control mode, in the case where the lean angle that is acquired during prohibition of the automatic cruise deceleration operation falls below the lean angle reference value, the automatic cruise deceleration operation is permitted.
7. The controller according to claim 1, wherein
the acquisition section (61) acquires a change rate of a state amount that is related to posture of the motorcycle (100) during turning travel, and
in the control mode, in the case where the change rate exceeds a change rate reference value, the automatic cruise deceleration operation is prohibited.
8. The controller according to claim 7, wherein
the state amount includes the lean angle of the motorcycle (100).
9. The controller according to claim 7, wherein
the state amount includes an angular velocity of the lean angle of the motorcycle (100).
10. The controller according to claim 1, wherein
in the control mode, the automatic deceleration is controlled by controlling a braking force that is applied to a wheel (3, 4) of the motorcycle (100).

11. The controller according to claim 1, wherein
in the control mode, the automatic deceleration is controlled by controlling engine output of the motorcycle (100).

12. A control method controlling behavior of a motorcycle, the control method comprising:
an execution step of initiating a control mode to make the motorcycle perform an automatic cruise deceleration operation, when a distance from the motorcycle to a preceding vehicle falls below a distance reference value, or when a body speed of the motorcycle exceeds a speed reference value; and
an acquisition step of acquiring a lean angle of the motorcycle, wherein
in the control mode, automatic deceleration that is deceleration of the motorcycle generated by the automatic cruise deceleration operation is controlled in accordance with the lean angle.

* * * * *